July 26, 1960 W. MIEHLE 2,946,988

NON-DESTRUCTIVE MAGNETIC STORAGE

Original Filed Jan. 29, 1954 2 Sheets-Sheet 1

INVENTOR
WILLIAM MIEHLE
BY
Lawrence R. Brown
ATTORNEY

July 26, 1960 W. MIEHLE 2,946,988

NON-DESTRUCTIVE MAGNETIC STORAGE

Original Filed Jan. 29, 1954 2 Sheets-Sheet 2

INVENTOR
WILLIAM MIEHLE
BY
Laurence R. Brown
ATTORNEY

United States Patent Office 2,946,988

Patented July 26, 1960

2,946,988

NON-DESTRUCTIVE MAGNETIC STORAGE

William Miehle, Havertown, Pa., assignor to Burroughs Corporation, Detroit, Mich., a corporation of Michigan Continuation of application Ser. No. 407,120, Jan. 29, 1954. This application Jan. 30, 1959, Ser. No. 791,002

12 Claims. (Cl. 340—174)

This application is a continuation of my copending application Serial No. 407,120, filed January 29, 1954, now abandoned.

This invention relates to magnetic switching circuits and methods. More particularly it relates to magnetic shift register circuits in which stored magnetic information may be read-out without destruction.

Shift registers of the type utilizing static magnetic elements for the storage of binary information are well known in the art as evidenced by articles such as that entitled "An Electronic Digital Computer" published in Electronic Engineering, December 1950, by A. D. Booth. In general, these static magnetic elements comprise transformers having core materials of a substance having a substantially rectangular hysteresis characteristic, and tending to remain in a permanent magnetic remanence condition after being driven into saturation by input driving pulses at a transformer winding. When an element is in a particular remanence condition, little voltage will be induced in the windings of the transformer by input signals of the polarity tending to establish the same remanence condition in the element. However, when the input signal is of an opposite polarity, a high voltage is induced and an output signal is developed in the transformer windings about the element. Accordingly, the binary storage elements may be sensed with a pulse of a known polarity to determine the polarity of the remanence condition. In order to provide the maximum output signals with prior art devices however, the sensing pulse will be of such amplitude that it will drive the element to saturation and leave the element in a state of opposite remanence polarity, thereby destroying the information which was originally stored in the core.

When the static magnetic elements are used in a shift register, it has been usual in the prior art to read the information out of the register thereby destroying it so that it is necessary to replace the information in the register for reuse. In a serial input-serial output register this is not particularly objectionable since the information may be regenerated as it is read out. However, when information is read serially into the register and is read-out in parallel, it must be re-entered into the register serially at the expense of considerable loss of time. Accordingly, the present invention is directed to means and methods for retaining the information storage in a shift register circuit adapted for serial input and parallel output operation.

In addition to shift register applications, the static magnetic elements are particularly adapted for use as electronic switches or gates for selectively coupling input information from one circuit to another. In prior art applications of such magnetic gates it has been necessary to separately gate each bit of stored information. However, in accordance with this invention, magnetic elements may be used for selectively gating any desired number of cyclically recurring pulses.

It is, therefore, a general object of the invention to provide improved electronic switching circuits and methods.

It is another object of the invention to provide electronic register circuits and gating circuits operable with static magnetic elements.

A further object of the invention is to provide non-destructive read-out operation with static magnetic storage elements.

A still further object of the invention is to provide improved magnetic shift registers affording serial input and parallel output operation.

In accordance with the invention, therefore, there is provided a two-element static magnetic storage device connected for circulating a bit of information of one magnetic state alternately from one element to the other, and deriving an output signal from one of the elements in response to the transfer of a bit into or out of the element. In such a register, means are provided for initially clearing the two elements to a binary remanence state opposite that of the circulating bit, so that the bit of information may be entered selectively into only one of the elements. Bits of information of a first binary state are thereby circulated by the storage device, by means including a source of pulses of a polarity establishing a remanence state opposite that of the circulating bit. These pulses are coupled to alternately drive the respective elements, thereby transferring the stored bit from one element to the other. Thus, while the bit of information circulates in response to the driving pulses, output signals are provided at a winding on one or both of the storage elements. Circulation of the bit is necessary to provide output signals. The register thereby serves to conditionally gate the driving pulses at one of the elements to an output circuit as long as the bit is circulating. Likewise, non-destructive read-out of the stored bit is possible for as many cycles as desired before the register is cleared.

Other objects and features of advantage of the invention will be found throughout the following detailed description of the invention, which may be more readily understood when considered in connection with the accompanying drawing, in which:

Fig. 1 is a combined schematic, waveform and logical drawing of a register operating in accordance with the invention, wherein Fig. 1A is a schematic circuit diagram of a non-destructive magnetic storage register;

Fig. 1B is a waveform chart along a time axis showing waveforms which are externally provided for operation of the register, as well as the waveforms for the operating conditions within the register, and Fig. 1C is a logical diagram of the circuit of Fig. 1A;

Figure 1:
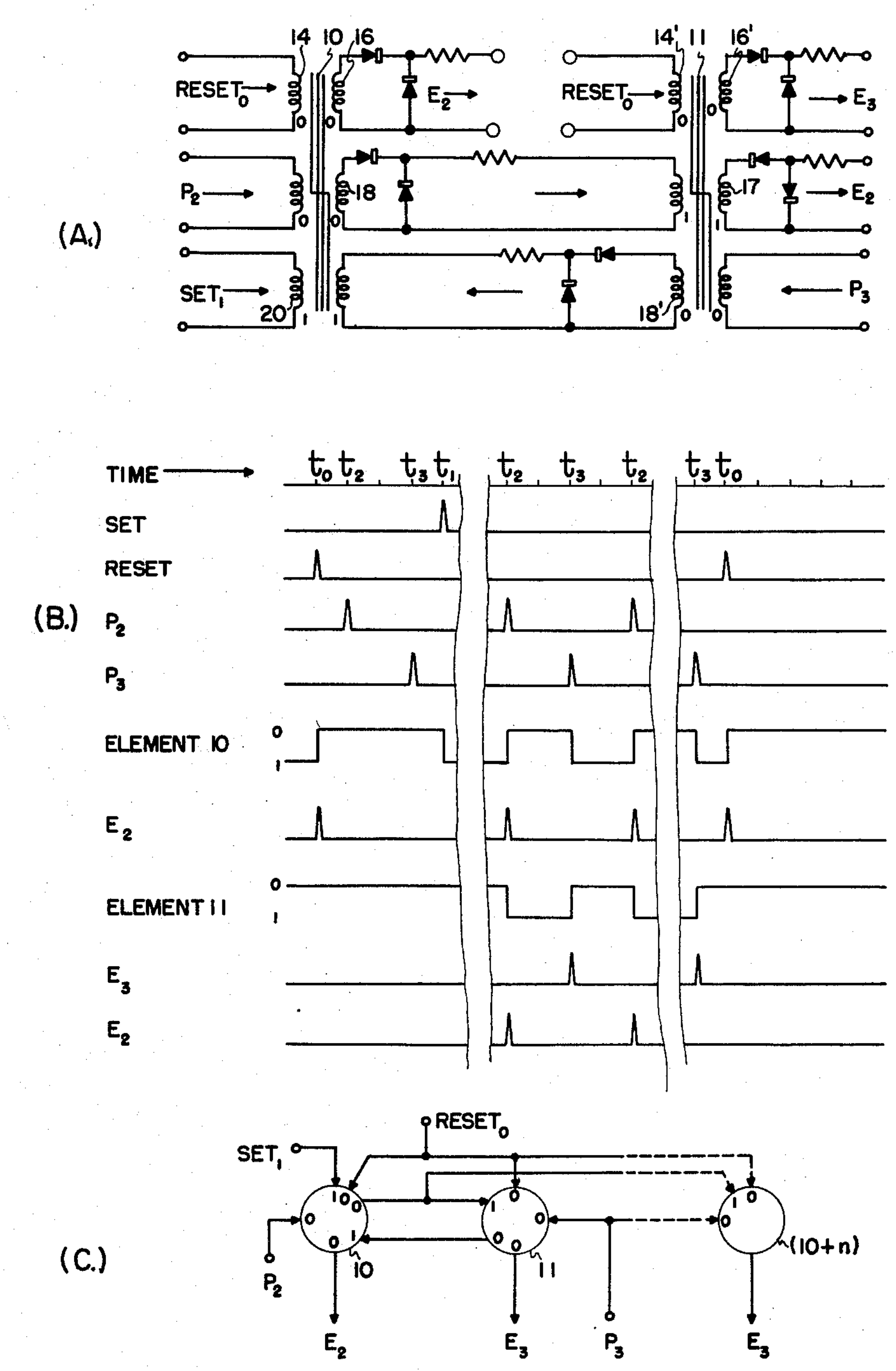

Throughout the drawings like reference characters will be used where possible to indicate similar circuit elements in order to facilitate comparison of the different figures. Where circuits are duplicated or circuits are used for purposes of illustration which are well known in the art and whose details are not part of the invention, logical circuit diagrams are used to illustrate the operation of the invention, so that the character of the present invention may be more readily ascertained. No attempt is made to minimize the number of windings set forth in the illustration, but separate windings are designated in order to illustrate the several operational features of the invention and thereby simplify the functional description. It will be obvious, however, to those skilled in the art that windings may be used for dual purposes where convenient from economic considerations, and that other modifications may be made without departing from the operational techniques falling within the spirit and scope of the present invention.

Referring now specifically to Fig. 1, two static magnetic elements 10 and 11 are shown, wherein the magnetic core material is illustrated to show that it has a substantially rectangular hysteresis characteristic and readily assumes one of two opposite states of magnetic remanence.

Several windings are located upon each of the magnetic elements for performing the different functions necessary for operation in accordance with the principles of this invention. Arrows are associated with each winding to indicate the direction of signal flow, and the binary notations "1" and "0" indicate the relative states of remanence associated with each winding. Thus, a signal applied simultaneously to the reset windings 14 and 14' will establish a storage state of "0" in both elements. If a "1" has been stored in either of the elements 10 or 11, an output signal will be generated by the respective output windings 16 or 16' as the storage state of the element is changed to "0." In connection with the present circuit operation, the different windings should be actuated in a predetermined order. This may be seen by reference to the waveform diagrams of Fig. 1B, where the notations $t_0$, $t_1$, $t_2$, and $t_3$ indicate the timed sequence of the different operations rather than the particular time at which the pulses are generated along the axis. Thus, in the first time $t_0$ of the sequence, each core should be reset to "0," as indicated by the "Reset$_0$" order. After both cores are reset, the element 10 may be primed for operation by establishing the binary state "1" in the next sequential "set$_1$" operation at time $t_1$. The set operation may take place simultaneously with another signal at the time $t_3$ rather than at the time $t_1$, if preferred. However, for the purpose of simplifying the explanation, the set signal will only be described hereinafter as occurring at time $t_1$. Since the set input pulse of polarity "1" does not produce output pulses in either output winding 16 or the transfer winding 18, which require a return from the "1" state to the "0" state to induce an output pulse, as provided by the polarity of the diodes, the set pulse serves the sole function of placing the element 10 in a storage condition "1."

The set and reset pulses are caused to occur non-cyclically in response to manual operation or some intelligence derived from a computer circuit or the like. The alternate advancing pulses $P_2$ and $P_3$ however, are derived from some suitable pulse generator to occur cyclically. Therefore, after the set pulse is caused to store a "1" in the element 10 by way of winding 20, the advancing pulse $P_2$ restores the element 10 to the "0" state, and induces an output signal at both windings 16 and 18. The output signal at winding 16 may be used at an external circuit, whereas the output signal at winding 18 is caused to transfer the binary bit of information, which is removed from element 10, into the element 11. By like action the next advancing pulse $P_3$ applied to element 11 will restore the bit of information to element 10 by way of the transfer winding 18', and simultaneously afford an output signal at the output winding 16'. An alternate output winding 17 may be provided if desired to afford an output signal at time $t_2$ when element 11 is changed from the "0" to "1" state by transfer of the bit from element 10 thereinto upon actuation of the advancing pulse $P_2$.

The circulation of the bit of information from one element to the other will continue in response to the alternate $P_2$ and $P_3$ pulses until both elements are reset to the "0" state. Thus, in effect there is provided a system for obtaining non-destructive read-out of the stored bit. In addition, the system may be used as a gating circuit where the advancing pulses P to one of the elements may be considered gated to the output windings 16 as long as a "1" is circulating in the two cores. Thus, a set pulse inserted at winding 20 will open the gating circuit, and a reset pulse simultaneously inserted at both windings 14 and 14' will close the gating circuit.

Return now for more specific reference to the waveforms of Fig. 1B where not only the external pulses applied to the elements are shown, but also the internal conditions of storage within the elements. Thus, assuming a reset condition at time $t_0$, the element 10 will be reset to the "0" storage state as described, thereby affording an output pulse $E_2$ at winding 16. Since the element 11 is already in a "0" state at time $t_0$, no output pulse will occur. The reset winding 14' upon element 11, however, is necessary since the transfer winding 18 would otherwise tend to set the element 11 in the "1" storage state in response to a single reset input at reset winding 14. Therefore, the reset winding 14' serves to inhibit the transfer of a "1" from element 10, and assures that both elements are reset to a "0" state. Alternately the reset pulse could be inserted at time $t_3$ to element 10 or at time $t_2$ to element 11, since at that time the respective advancing pulses $P_3$ and $P_2$ would serve the inhibit function. The output pulses are developed as the elements are changed into a particular storage state determined by the orientation of the rectifiers shown in the output windings 16 and 17. Likewise, the storage state afforded in the elements by input pulses may be determined by the direction in which current is passed through the windings about the elements.

While both cores are in a "0" state, the arrival of the further "0" pulses $P_2$ and $P_3$ at respective times $t_2$ and $t_3$, maintain the cores in "0" state and therefore afford no change in storage condition and no output pulse. However, if a "1" set input pulse at time $t_1$ is applied, it will change the storage condition of element 10 to "1." Advancing pulses $P_2$ and $P_3$ will alternately transfer the "1" storage state between element 10 and element 11, and respectively afford corresponding output pulses $E_2$ and $E_3$ at the respective times $t_2$ and $t_3$. This occurs until a further reset condition occurs at the relative time $t_0$ sequentially timed to arrive between a $P_3$ advancing pulse and the subsequent $P_2$ advancing pulse. At this time $t_0$ an output pulse is provided at winding 16 on element 10 if a "1" is stored in the element 10 at the time of reset thereby affording the required switching of the element from "1" to "0." If this condition is undesirable the output winding 16' on element 11 is preferred, since it will always be in a "0" state at the relative time $t_0$ and will not afford an output signal responsive to the reset operation. The inhibit action of reset winding 14' will prevent an output pulse at the alternate output winding 17 if there should be a "1" stored in element 10. It is, therefore, recognized in the described circuit that the properly selected time sequence of input pulse actuation enables information to be placed in the elements for circulation affording those advantages associated with the teachings of the invention. Should the pulses not arrive in the sequence described, other precautions would need be taken. For example, if the reset pulse occurred while the "1" was stored in element 11, it would be changed to "0" thereby affording an output pulse at winding 16' which may be undesirable. It is, however, to be recognized that the same general operation accomplished with the specific embodiment shown may be modified by use of other circuit embodiments which will be suggested to those skilled in the art by the teachings of the non-destructive storage feature of this invention when applying it for use under different circumstances.

Fig. 1C illustrates logical terminology which is used hereinafter for simplification of the description of the invention. Each static magnetic element is illustrated by the circle diagrams 10 or 11, with input and output windings being designated by arrows upon leads respectively entering or leaving the circle. The storage state into which input pulses drive the core are illustrated by the binary notation at the end of the input leads. Likewise, the binary designation at the output leads indicate that an output pulse will be provided at the time the core is changed from the opposite binary state to that binary state. Thus, the logical notation of cores 10 and 11 of Fig. 1C correspond directly to the notation of Fig. 1A. It is indicated in the logical drawing that further cores (10+$n$) may be connected in parallel to core 11 to drive additional isolated circuits with output pulses $E_3$ produced at the time $t_3$.

Figure 2:
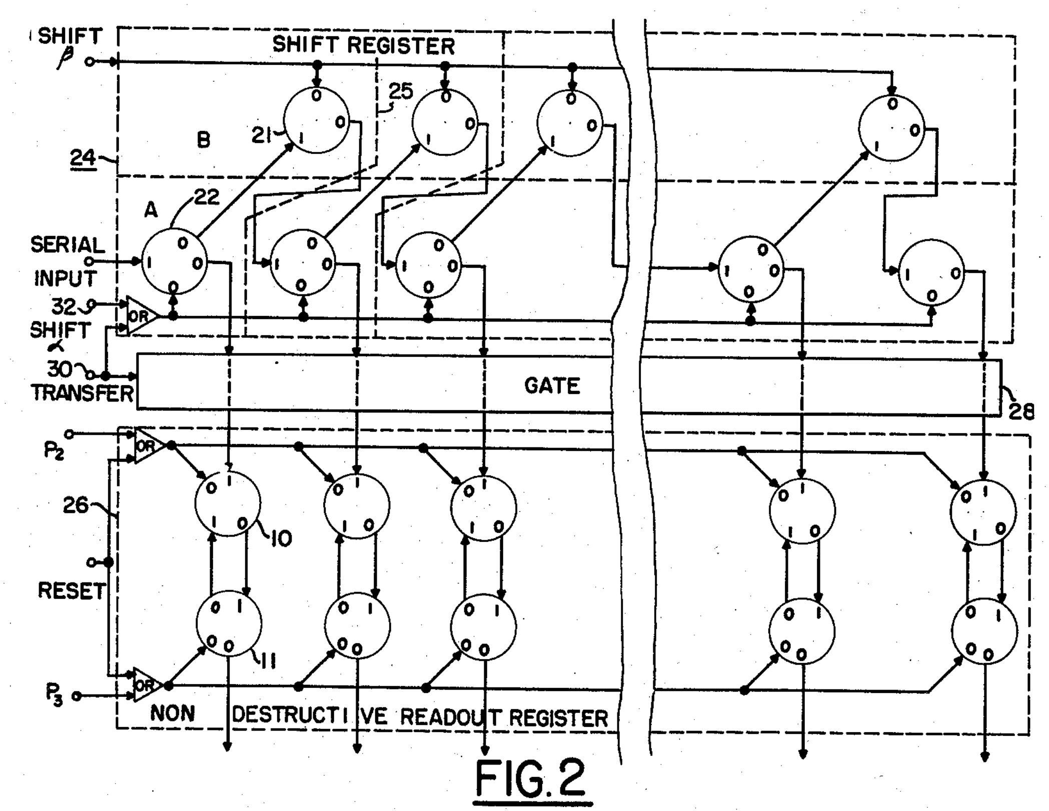
Fig. 2 is a logical circuit diagram of a serial input-parallel output magnetic shift register operated in accordance with the invention to obtain non-destructive read-out.

In Fig. 2 a non-destructive read-out register of the type described is shown incorporated in a serial input-parallel output shift register system. Thus, the shift register 24 is a conventional serial input register having two static magnetic elements per stored binary bit. This register has a storage bank 25 of two elements 21 and 22 denoting each stored bit connected in cascade circuit with the succeeding bank. One element of each bank contains the stored bit for each bank as it temporarily is held in the respective lower and upper storage sub-registers A and B. Thus, the stored information is alternately held in each sub-register as it progresses from element to element in response to the shift pulses $\alpha$ and $\beta$. Ordinarily this conventional shift register is not well adapted for use in parallel read-out applications where the information read out in parallel is to be used more than once. This occurs because at least some of the stored information is destroyed when read out (by the shift $\alpha$ pulses), and therefore it is necessary to take additional time to read the information back into the register in serial fashion before a further parallel read-out may be accomplished. The advantage of parallel read-out is to speed up operation, so that many parallel operations may be performed during the same time period necessary for a single serial operation. Accordingly, the present invention affords a non-destructive read-out register 26 into which the information is read out of the shaft register 24 in parallel by means of transfer instructions simultaneously opening the transfer gate 28 and actuating the shift $\alpha$ line. In this manner the information may be read out of register 26 as many times as necessary, and further serial information may be read into the register 24 at the same time that the read-out register 26 is being used, thereby further conserving the elapsed time for an operation. The gating circuit 28 may, in one instance, comprise vacuum tube amplifiers which are normally cut off by a bias source, but which are placed in a condition for passing a signal by a transfer pulse at the transfer input terminal 30. The details of the gating circuit itself do not constitute a part of the present invention. This transfer pulse simultaneously affords a signal at the shift $\alpha$ input through the "or" gate so that information is read out of the lower shift sub-register through the gate and into the upper tier of elements in the read-out register 26. The elements of the non-destructive read-out register 26 are connected to operate in the manner described in connection with Fig. 1A, by alternately shifting the information back and forth between the upper to lower tiers thereby preserving it for additional read-out until such time that reset signals are provided.

Figure 3:
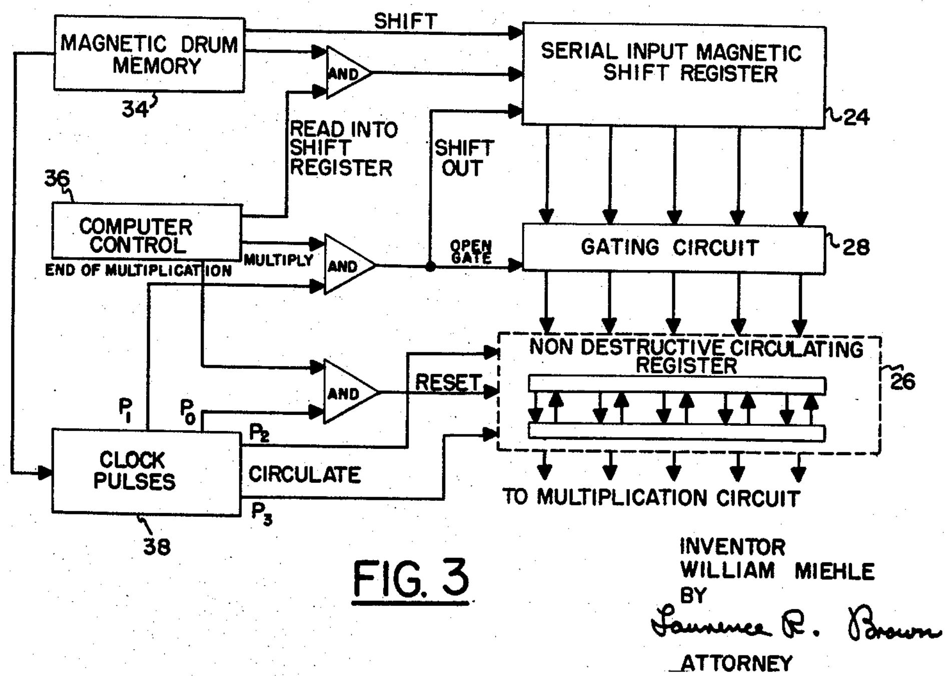
Fig. 3 is a block diagram of a computer system incorporating the invention.

By means of the present invention an improved computer circuit such as shown in Fig. 3 may be constructed. In arithmetic circuits of a computer it is generally desired to perform at least the operations of addition and multiplication. In general, the multiplication operation takes a much longer period of time to perform than the addition and constitutes a computer bottleneck. Many machines are constructed for serial operation because the circuits are thereby simplified. Therefore, the adder circuit of such a machine is constructed for serial operation upon one bit at a time. To remove the multiplication bottleneck, however, the multiplication might be done in parallel operation upon all bits of the number at the same time. Therefore, multiplication may be completed during substantially the same time period that it would take for performing the addition. For this purpose the serial input-parallel read-out circuit 24, 26, and 28 described in connection with Fig. 2 is utilized. Numbers read out of the magnetic drum memory 34 into the serial input register 24 may thereby be gated in circuit 28 by a multiplication command from the computer control circuit 36. The timing of the computer commands is performed by means of pulses from a clock pulse generator 38 synchronized with the magnetic drum memory 34. Thus, where timing of computer control pulses is necessary, logical "and" circuits are provided requiring simultaneous presence of the clock pulses in their appropriate relative time and the operational command from the control circuit 36. It is recognized from the computer diagram shown that the circuits of the present invention may be incorporated in the design of a computer to afford more efficient operation.

Having therefore described the invention and its operation, those features of novelty which are believed descriptive of the nature of the invention are found described in the appended claims.

I claim:

1. A system for selectively gating cyclically recurring pulses comprising in combination, voltage means for providing alternate cyclically recurring input pulses at two leads; a pair of static magnetic binary storage elements; circuit means coupling each of said leads to one of said pair of elements to establish a first binary storage state in each element by operation of said input pulses; a third static magnetic binary storage element having an input circuit coupled thereto for transferring information into said third storage element by setting said third element selectively into one of its magnetic storage states, an output circuit coupled to said third storage element for interconnecting said third element to a load, and a coupling circuit connected between said third storage element and a first storage element of said pair, said coupling circuit including at least one asymmetrical current conducting device poled to permit information signals to pass from said third storage element to said first element but to inhibit information flow in the reverse direction; means for conditioning the elements of said pair to couple pulses from at least one of said leads to an output circuit by setting said first element in a second storage state opposite said first state; said conditioning means including an advance winding on said third storage element for advancing information out of said third element through said coupling circuit and into said first element of said pair for setting said first element in correspondence with the storage state of said third element; means including at least one coupling circuit between said first and second storage elements of said pair for alternately shifting the second storage state back and forth between said first and second elements responsive to said alternate input pulses; and means for deriving gated output pulses from at least one of said pair of elements.

2. A system as defined in claim 1 further including means for setting both elements of said pair into an initial storage state corresponding to said first binary state, the last mentioned means including an input signal coupled to one of the elements in a polarity causing the element to attain said first binary storage state and timed to arrive when the element is in a second storage state, and inhibitive means responsive to the input signal to prevent shifting of the second storage state from said one element to the other.

3. A serial input-parallel output magnetic register system comprising in combination; a shift register having a plurality of storage banks each with two static magnetic elements for storing a binary bit; circuit means connecting said banks in said shift register in cascade to thereby establish a pair of storage sub-registers for each bank, each sub-register including one of the elements of each bank, the pair of sub-registers of each bank being connected for alternately holding the stored information; means for serially entering information into one bank of the shift register and progressively stepping each bit of information from one element to another; means for selectively transferring information out of at least one of said pair or storage sub-registers in parallel; and a non-destructive read-out register coupled to receive the transferred information including a pair of auxiliary static magnetic elements per storage bank, a plurality of circuit means each interconnecting the two auxiliary static magnetic elements of one of said pairs for circulating transferred binary information of only one polarity back and forth between the auxiliary storage elements of each of said pairs, means for reading information out of the non-destructive register during circulation, and means for selectively clearing said non-destructive read-out register in a time sequence before information is transferred into it from the sub-register.

4. A dynamic storage system adapted to produce a train of output pulses from a single input data pulse, said system comprising: first and second magnetic storage elements each capable of assuming either of two stable states of magnetic remanence, one of which is a reference state; first coupling means interconnecting said first and second elements, said first coupling means including first output means associated with said first element, first input means associated with said second element, and a first asymmetrically conducting device for inhibiting feedback from said first input means to said first output means; second coupling means interconnecting said first and second elements, said second coupling means including second output means associated with said second element, second input means associated with said first element, and a second asymmetrically conducting device to inhibit feedback from said second input means to said second output means; a third magnetic storage element capable of assuming either of two stable states of magnetic remanence having an input circuit coupled thereto for transferring information into said third storage element by setting said third element selectively into one of its magnetic storage states, an output circuit coupled to said third storage element for interconnecting said element to a load, and a coupling circuit connected between said third storage element and said first storage element, said coupling circuit including at least one asymmetrical current conducting device poled to permit information to pass from said third storage element to said first element but to inhibit information flow in the reverse direction; means for applying a data input pulse to said first element at a first time period to place said first element in a stable magnetic state other than its reference state; said data supplying means including an advance winding on said third storage element for advancing information out of said third element through said coupling circuit and into said first element for setting said first element in correspondence with the storage state of said third element; means for applying to said first element during a second time period a shift pulse to switch said first element from said other state to said reference state, thereby to effect by way of said first coupling means the switching of said second element to a stable state other than its reference state; means for applying to said second element during a third time period a shift pulse to switch said second element from its said other state to its said reference state, thereby to effect by way of said second coupling means the switching of said first core from said reference state to said other state; means for applying recurring second and third shift pulses periodically to said first and second elements respectively, whereby repeated back and forth switching of said first and second elements between said other and said reference states is effected; and utilization output means associated with at least one of said first and second elements for deriving a train of pulses in response to said repeated switching of the element with which said utilization output means is associated.

5. Apparatus as claimed in claim 4 characterized in that means are provided for inhibiting at a fourth time period the switching of said second element to said other state when said first element is switched to said reference state, thereby to interrupt the repeated switchings of said first and second elements.

6. A dynamic storage system adapted to produce a train of output pulses from a single input data pulse, said system comprising: first, second and third magnetic storage elements each capable of assuming either of two stable states of magnetic remanence, one of which is a reference state; said third storage element having an input circuit coupled thereto for transferring information into said third storage element, by setting said third element selectively into one of its stable magnetic remanent states, an output circuit coupled to said third storage element for interconnecting said element to a load, and a coupling circuit connected between said third storage element and said first storage element, said coupling circuit including at least one unidirectional current conducting device poled to permit information to pass from said third storage element to said first element but to inhibit information flow in the reverse direction; means for applying a data pulse to said first element at a first time period to place said first element in a stable state other than its reference state; said means including an advance winding on said third storage element for advancing information out of said third storage element through said coupling circuit and into said first element for setting said first element in correspondence with the storage state of said third element; means for applying to said first element during a second time period a shift pulse to switch said first element from said other state to said reference state; first coupling means responsive to the switching of said first element to said reference state for switching said second element to a stable state other than its reference state; means for applying to said second element during a third time period a shift pulse to switch said second element from its said other state to its said reference state; second coupling means responsive to the switching of said second core to said reference state for switching said first core from said reference state to said other state; means for applying recurring second and third shift pulses periodically to said first and second elements respectively, thereby to effect switching of said first and second elements repeatedly between said other and said reference states; and utilization output means associated with at least one of said first and second elements for deriving a train of pulses in response to said repeated shifting of the element associated therewith.

7. Apparatus as claimed in claim 6 characterized in that inhibit means are provided for inhibiting at a selected time the switching of said second element to said other state when said first element is switched to said reference state, thereby to interrupt the repeated switchings of said first and second elements, and thereby to terminate the train of pulses derived from said data pulse.

8. In a non-destructive storage system; the combination comprising a plurality of magnetic cores each capable of assuming either of two stable states of magnetic remanence, a first of said magnetic cores having input circuit means for setting an informational bit into said core storing one or the other of said stable states, output circuit means for transferring an informational bit out of said core, circuit means separate from said input and output circuits for setting an informational bit into a second of said magnetic cores corresponding to the state of said first core, coupling means including a unidirectional current path having a winding on said second core connected to a winding on a third of said cores; means for transferring the informational bit stored in said second core back and forth through said coupling means between said second and third cores and utilization output means associated with one of said second and third cores for deriving an output indicating the state of said first core, whereby repeated indications of the storage state of said first core may be delivered to said utilization output means without destroying the storage state of said first core.

9. A system for providing repeated output indications of the static state of a storage device comprising, a plurality of magnetic cores each capable of assuming either of two stable states of magnetic remanence, one of which is a reference state, input means for setting a first and a second of said cores into corresponding states of magnetic remanence, an advancing winding for setting said second core to its reference state, coupling means including a unidirectional current path connecting said second core to a third of said cores, output means associated with said third core for providing output signals indicating without destroying the storage state of said first core, an advancing winding for setting said third core to its reference state and means for alternately energizing said advancing windings of said second and third cores to provide said output signals in response to said alternate energization.

10. A plurality of magnetic storage cores coupled together, each of said storage cores being capable of assuming either of two stable states of magnetic remanence; data signal input means coupled to at least a first of said storage cores for storing informational data in said storage cores, said data being indicated by the respective states of said storage cores resultant from said data input signals; a pair of magnetic read-out cores for each core of a plurality of storage cores, each of said read-out cores being capable of assuming either of two stable states of magnetic remanence; gating means for coupling each core of said plurality of storage cores to the first of the pair of read-out cores associated with said particular storage core; circuit means coupling together the first and second read-out cores of each said pair; means including said gating means for placing said first read-out core of a pair in a state of remanence determined by the then state of the associated storage core, thereby to place informational data in said first read-out core according to the data then in said storage core; shift means for transferring the informational data represented by the state of said first read-out core to said second read-out core and for re-transferring the said informational data from said second read-out core back to said first read-out core; and output means coupled to at least one of said read-out cores of each pair for developing an output signal indicative of the state of said associated storage core at the time said first read-out core was placed in a state determined by the then state of said associated storage core.

11. Apparatus as claimed in claim 10 characterized in that said output means is coupled to said second core of said pair of read-out cores.

12. Apparatus as claimed in claim 11 characterized in that said shift means for transferring said informational data from said first read-out core to said second read-out core and for re-transferring the said informational data from said second read-out core back to said first read-out core is adapted to repeat the said transfer and re-transfer, thereby to develop a series of output signals each indicative of the state of the associated storage core at the time the said first read-out core was placed in a state determined by the then state of said associated storage core.

References Cited in the file of this patent

UNITED STATES PATENTS

| | | |
|---|---|---|
| 2,673,337 | Avery | Mar. 23, 1954 |
| 2,708,722 | An Wang | May 17, 1955 |

OTHER REFERENCES

"Magnetic Trigger Circuits," An Wang, Proceedings of IRE, June 1950, pp. 626–629.

"A Magnetic Scaling Circuit," Helmuth Hertz, Journal of Applied Physics, vol. 22, January 1951, pp. 107–108.